US012459680B2

(12) United States Patent
Perumalla et al.

(10) Patent No.: US 12,459,680 B2
(45) Date of Patent: Nov. 4, 2025

(54) SNAKE-ARM ROBOT CAPABLE OF CONVERTING TO A DRONE

(71) Applicant: INTERNATIONAL BUSINESS MACHINES CORPORATION, Armonk, NY (US)

(72) Inventors: Saraswathi Sailaja Perumalla, Visakhapatnam (IN); Sarbajit K. Rakshit, Kolkata (IN); Venkata Ratnam Alubelli, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 17/807,182

(22) Filed: Jun. 16, 2022

(65) Prior Publication Data
US 2023/0406496 A1 Dec. 21, 2023

(51) Int. Cl.
*B25J 9/06* (2006.01)
*B25J 19/02* (2006.01)
*B64U 10/13* (2023.01)
*B64U 30/20* (2023.01)
*B64U 101/30* (2023.01)

(52) U.S. Cl.
CPC ............. *B64U 30/20* (2023.01); *B25J 9/065* (2013.01); *B25J 19/023* (2013.01); *B64U 10/13* (2023.01); *B64U 2101/30* (2023.01)

(58) Field of Classification Search
CPC ......... B25J 9/065; B25J 19/023; B64U 30/20; B64U 10/13; B64U 2101/30; B64C 37/02
See application file for complete search history.

(56) References Cited

U.S. PATENT DOCUMENTS

| 3,226,056 A * | 12/1965 | Holland, Jr. ............ B64C 37/02 244/2 |
| 9,457,899 B2 * | 10/2016 | Duffy ..................... B64U 10/16 |
| 2007/0102565 A1 * | 5/2007 | Speer ..................... B64U 10/20 244/2 |
| 2009/0294573 A1 * | 12/2009 | Wilson ................... B64U 10/25 703/7 |

(Continued)

FOREIGN PATENT DOCUMENTS

| IN | 202111012231 A | 3/2021 |
| JP | 2020111070 A | 7/2020 |
| WO | WO-2018144544 A1 * | 8/2018 ............. B64C 37/02 |

OTHER PUBLICATIONS

Arnold, R.D., Yamaguchi, H. & Tanaka, T. Search and rescue with autonomous flying robots through behavior-based cooperative intelligence. Int J Humanitarian Action 3, 18 (2018). https://doi.org/10.1186/s41018-018-0045-4.

Arns, M. (2019). Novel Reconfigurable Delta Robot Dual-Functioning as Adaptive Landing Gear and Manipulator. https://yorkspace.library.yorku.ca/xmlui/bitstream/handle/10315/36342/Arns_Moritz_R_2019_Masters.pdf?isAllowed=y&sequence=2.

(Continued)

*Primary Examiner* — Tye William Abell
(74) *Attorney, Agent, or Firm* — Kimberly Zillig

(57) ABSTRACT

A convertible robot including a plurality of modules connected one to another by one of a plurality of joints, wherein the plurality of modules has a first end and a second end that is adapted to allow for removable attachment to the first end. The convertible robot also includes a coupling that reversibly converts the plurality of modules between one configuration and at least one other configuration. One configuration is a snake-arm configuration in which the plurality of modules are in an elongated arrangement. Another configuration is a drone configuration in which the first and second ends of the plurality of modules are attached and in a loop-shaped arrangement.

20 Claims, 6 Drawing Sheets

(56) References Cited

U.S. PATENT DOCUMENTS

| | | | | |
|---|---|---|---|---|
| 2010/0193625 | A1* | 8/2010 | Sommer | B64U 20/40 |
| | | | | 244/2 |
| 2017/0101177 | A1* | 4/2017 | Smirnov | B64D 1/22 |
| 2017/0283054 | A1* | 10/2017 | Wang | G08G 5/80 |
| 2018/0043984 | A1* | 2/2018 | Robertson | B64U 10/25 |
| 2018/0118336 | A1* | 5/2018 | Drennan | B64C 37/02 |
| 2018/0155022 | A1 | 6/2018 | Hess | |
| 2019/0256207 | A1* | 8/2019 | Nohmi | G05D 1/0866 |
| 2021/0107653 | A1* | 4/2021 | Baharav | B64U 10/13 |
| 2022/0289374 | A1* | 9/2022 | Lim | B64D 9/00 |
| 2023/0017711 | A1* | 1/2023 | Garanger | B64C 37/02 |
| 2023/0234726 | A1* | 7/2023 | Garanger | B64C 37/02 |
| | | | | 244/7 R |

OTHER PUBLICATIONS

Cacace, J., Finzi, A., & Lippiello, V. (2016). Multimodal Interaction with Multiple Co-located Drones in Search and Rescue Missions. CoRR, abs/1605.07316. https://arxiv.org/pdf/1605.07316.pdf.

Jha, Bhaskar. (2016) Snake Robot—Presentation. School of Studies in Computer Science Pt. Ravishankar University. https://www.slideshare.net/bhaskar420/snake-robot.

Pinto, Eduardo & Santana, Pedro & Barata, J. (2013). On Collaborative Aerial and Surface Robots for Environmental Monitoring of Water Bodies. IFIP Advances in Information and Communication Technology. 394. 183-191. 10.1007/978-3-642-37291-9_20.

Snake arm robot. https://www.wikiwand.com/en/Snake-arm_robot. Retrieved from the internet on Apr. 5, 2022.

* cited by examiner

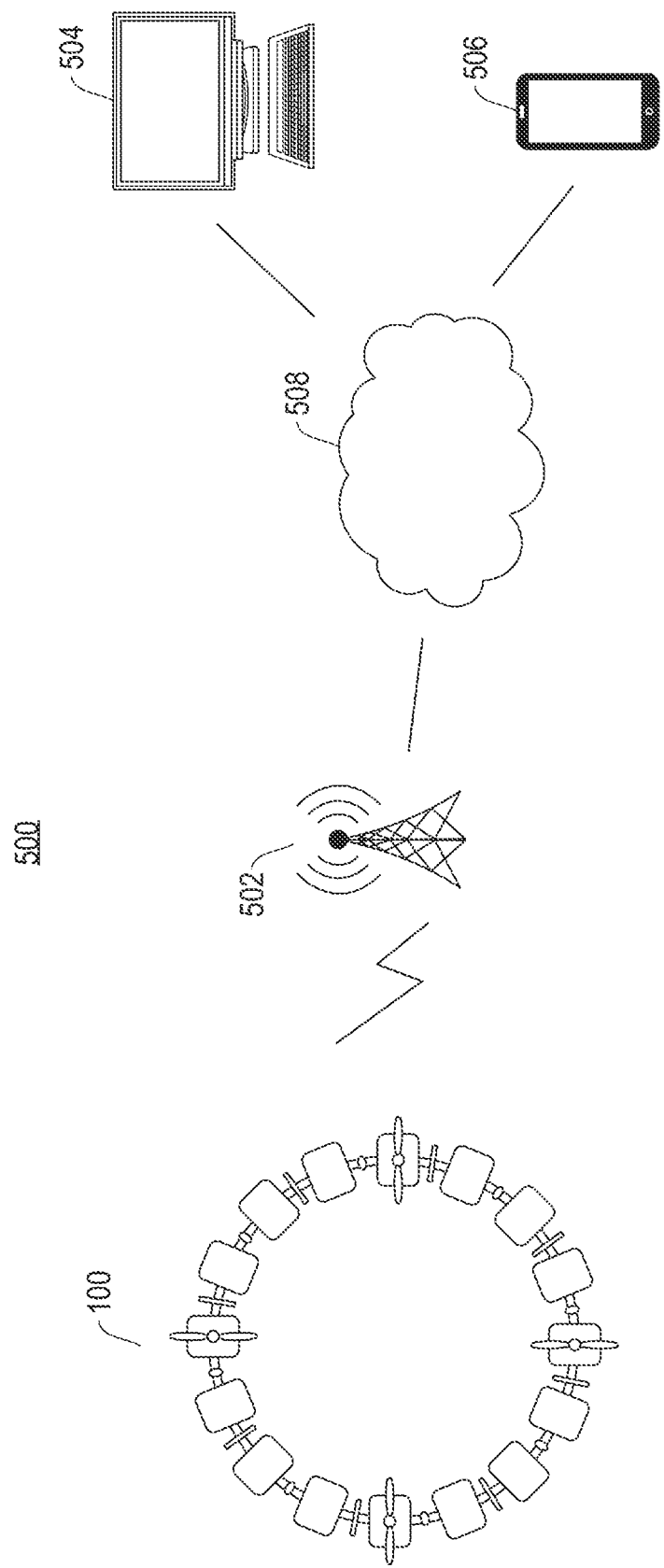

600

┌─────────────────────────────────────────┐
│ Providing a Convertible Robot Comprising a Plurality │
│ of Modules Connected to Each Other with a Plurality  │ — 610
│ of Joints and a Coupling that is Adapted to Allow for │
│ Conversion Between a Snake-Arm Configuration │
│ and a Drone Configuration │
└─────────────────────────────────────────┘
                     ↓
┌─────────────────────────────────────────┐
│ Converting the Convertible Robot from One │ — 620
│ Configuration to the Other │
└─────────────────────────────────────────┘

FIG. 6

SNAKE-ARM ROBOT CAPABLE OF CONVERTING TO A DRONE

BACKGROUND

The present disclosure relates to robots for rescue operations. More particularly, the present disclosure provides a robot that is capable of converting from a snake-arm configuration to a drone configuration and vice versa.

Robotics is an area of active research, and various types of robotic vehicles have been developed for various missions. Drones and robots are being used, for example, during rescue operations. During such rescue operations, analysis of the disaster surroundings is important. Rescue operations can be performed in dangerous surroundings, such as, for example, in a collapsed building, etc.

SUMMARY

According to some embodiments of the disclosure, there is provided a convertible robot including a plurality of modules connected one to another by one of a plurality of joints, wherein the plurality of modules has a first end and a second end that is adapted to allow for removable attachment to the first end. The convertible robot also includes a coupling that reversibly converts the plurality of modules between one configuration and at least one other configuration. One configuration is a snake-arm configuration in which the plurality of modules are in an elongated arrangement. Another configuration is a drone configuration in which the first and second ends of the plurality of modules are attached and in a loop-shaped arrangement.

According to some embodiments of the disclosure, there is provided a system that includes a plurality of the convertible robots. Each of the convertible robots includes a plurality of modules connected one to another by one of a plurality of joints, wherein the plurality of modules has a first end and a second end that is adapted to allow for removable attachment to the first end, and a coupling that reversibly converts the plurality of modules between one configuration and at least one other configuration. One configuration is a snake-arm configuration in which the plurality of modules are in an elongated arrangement. Another configuration is a drone configuration in which the first and second ends of the plurality of modules are attached and in a loop-shaped arrangement. The plurality of convertible robots are adapted to allow for attachment to each other while in the snake-arm configuration and adapted to allow for remaining attached to each other in the drone configuration.

According to some embodiments of the disclosure, there is provided a method of delivering a convertible robot to a rescue site. The method includes an operation of providing a convertible robot. The convertible robot includes a plurality of modules connected one to another by one of a plurality of joints, wherein the plurality of modules has a first end and a second end that is adapted to allow for removable attachment to the first end. The convertible robot also includes a coupling that reversibly converts the plurality of modules between one configuration and at least one other configuration. One configuration is a snake-arm configuration in which the plurality of modules are in an elongated arrangement. Another configuration is a drone configuration in which the first and second ends of the plurality of modules are attached and in a loop-shaped arrangement. The method also includes an operation of converting the convertible robot from one of the configurations to the other.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 is a schematic illustration of a system, in accordance with embodiments of the present disclosure; and FIG. 6 is a flow diagram of a method of delivering a convertible robot to a rescue site, in accordance with embodiments of the disclosure.

Figure 1:
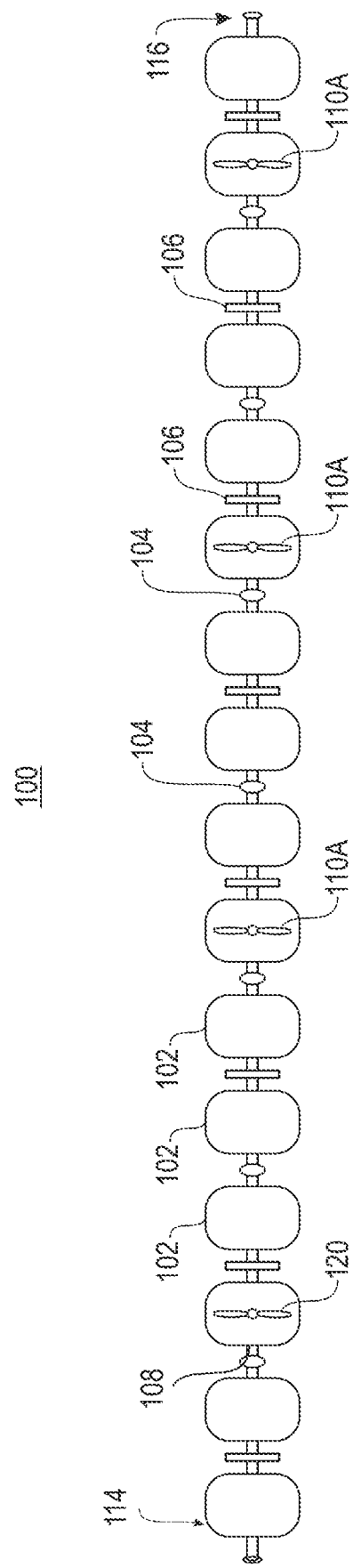
FIG. 1 is a schematic, top-view illustration of a robot in a snake-arm configuration, in accordance with embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate generally to robots for rescue operations. More particularly, the present disclosure provides a robot that is capable of converting from a snake-arm configuration to a drone configuration and vice versa. While the present disclosure is not necessarily limited to such applications, various aspects of the disclosure can be appreciated through a discussion of various examples using this context.

During rescue operations, drones are useful in reaching rescue sites. For example, while entering inside a collapsed building, there can be large passages that are accessible by drones. There can be, in some situations, however, a need to get through narrow passages during a portion of the drone's mission. A drone useful to quickly reach a rescue site by air and to effectively perform many tasks may not be able to navigate through such narrow passages because of its size and shape.

A snake-arm robot is a computerized electro-mechanical device with many features found in industrial robotic arms. The "snake" description refers to the snake-arm robot's long, generally cylindrical shape, which can move in ways that are reminiscent of a snake. Snake-arm robots can have a continuous diameter along their length. Snake-arm robots can pass through narrow passages. Snake-arm robots can be, for example, tendon-driven or pneumatically-controlled.

Snake-arm robots are often used in association with another device. The function of the other device can be to introduce the snake-arm robot into a confined space, for example. An example of an introduction device for a snake-arm robot can a remote-controlled vehicle or an industrial robot.

Embodiments of the present disclosure relate to a robot that is capable of converting from a snake-arm configuration to a drone configuration and vice versa. For example, the present disclosure relates to a robot for checking for life and danger at a site in which a disaster situation has occurred, such as a building collapse. Based on the mission, the robot can be in the drone configuration to reach a rescue site by air, for example. The robot in the drone configuration can also be used to retrieve objects from, or deliver objects to, the rescue site. During its traversal to the rescue site, the robot in the drone configuration can convert autonomously or be instructed to convert to the snake-arm configuration in order to fit through narrow passages and/or to move along rough terrain or surroundings. The robot in the snake-arm configuration can convert autonomously or be instructed to convert back to the drone configuration in order to exit the rescue site by air.

In order to convert from the drone configuration to the snake-arm configuration, rotors or propellers on the drone that are used for flying can be collapsed. Based on contextual need, the robot in the snake-arm configuration can be configured for passing or entering through narrow passages, and/or can be configured for climbing or crawling. The robot can also include features, for example, in order to grip objects, deliver objects, or take video of surroundings, etc.

One feature and advantage of the disclosed device is that the device is capable of reaching hard-to-reach areas of a rescue site, for example, areas inaccessible by flying alone. Another feature and advantage of the disclosed device is that the device can be converted to different shapes and configurations in order to be flexible during rescue operations. Yet another feature and advantage of the disclosed device is that only one robot is needed in order to perform different tasks, such as flying into a rescue site through the air, and moving through narrow passages within the rescue site, for example.

For purposes of this disclosure, reference will be made to an illustrative robot that is capable of converting from a snake-arm configuration to a drone configuration and vice versa. Of course, the disclosure herein should not be considered to be limited to the illustrative examples depicted and described herein. With reference to the attached figures, various illustrative embodiments of the devices, systems and methods disclosed herein will now be described in more detail.

Turning to the figures, FIG. 1 illustrates a schematic, top-view of a robot 100 in a snake-arm configuration, consistent with some embodiments. The robot 100 includes a plurality of modules 102 in a generally linear arrangement, with the modules 102 being adjacent to each other and connected to each other using flexible joints (e.g., flexible rods, hinges, ball and socket joints, etc.) 104 and/or ribs 106. A combination of flexible joints 104 and ribs 106 can be included, or only flexible joints 104 can be included. The ribs 106 can be less flexible than the joints 104. The flexible joints 104 can connect mutually adjacent modules 102, and can allow the modules 102 to move with respect to each other. The flexible joints 104 can be locked to add rigidity and can be unlocked in order to be flexible and allow for movement. Other suitable joints allowing a snake-like movement while the robot 100 is in the snake-arm configuration are also contemplated. Movement of the robot 100 can also include a driving movement of the robot 100 while in the snake-arm configuration, which allows for forward and reverse movement and/or side-to-side movement.

A bundle of control wires 108 can extend through and between the plurality of modules 102 in order to control movement of the plurality of modules 102 and communicate movement instructions to the components of the robot 100. In general, the device 100 can include a movement control assembly (not shown) for controlling movement of the device 100. Any suitable movement control assembly is contemplated by the disclosure. Some examples include, without limitation, tendon-driven, motor-driven and pneumatically-controlled assemblies. The movement control process can involve using rods and joints, for example, to move the robot 100 in a serpentine fashion while in the snake-arm configuration and in conversion between the snake-arm configuration and the drone configuration.

Movement instructions for the modules 102 can be remotely communicated to the robot 100 from a computer or other device, for example, and to a communication unit (not shown) within the robot 100. The communication unit can be connected to one or more wires included in the bundle of control wires 108, and can be connected to the movement control assembly. A computer or mobile device, for example, can communicate wirelessly with a base station, which in turn can connect with the internet.

The robot 100, when in the snake-arm configuration, as shown in FIG. 1, can include a plurality of collapsible rotors 120. Four (4) collapsible rotors 120 in a collapsed position (indicated by 110A) are shown in FIG. 1 and located on four (4) different, evenly spaced, modules 102. However, other suitable numbers of rotors 120 having other suitable locations can be included in the robot 100. The rotors will be numbered generally as 120 if not specifically referred to as rotors in the expanded or collapsed positions (which are indicated as 110A or 110B, respectively). The rotors 120 are also generally referred to as "flight rotary assemblies."

Figure 2:
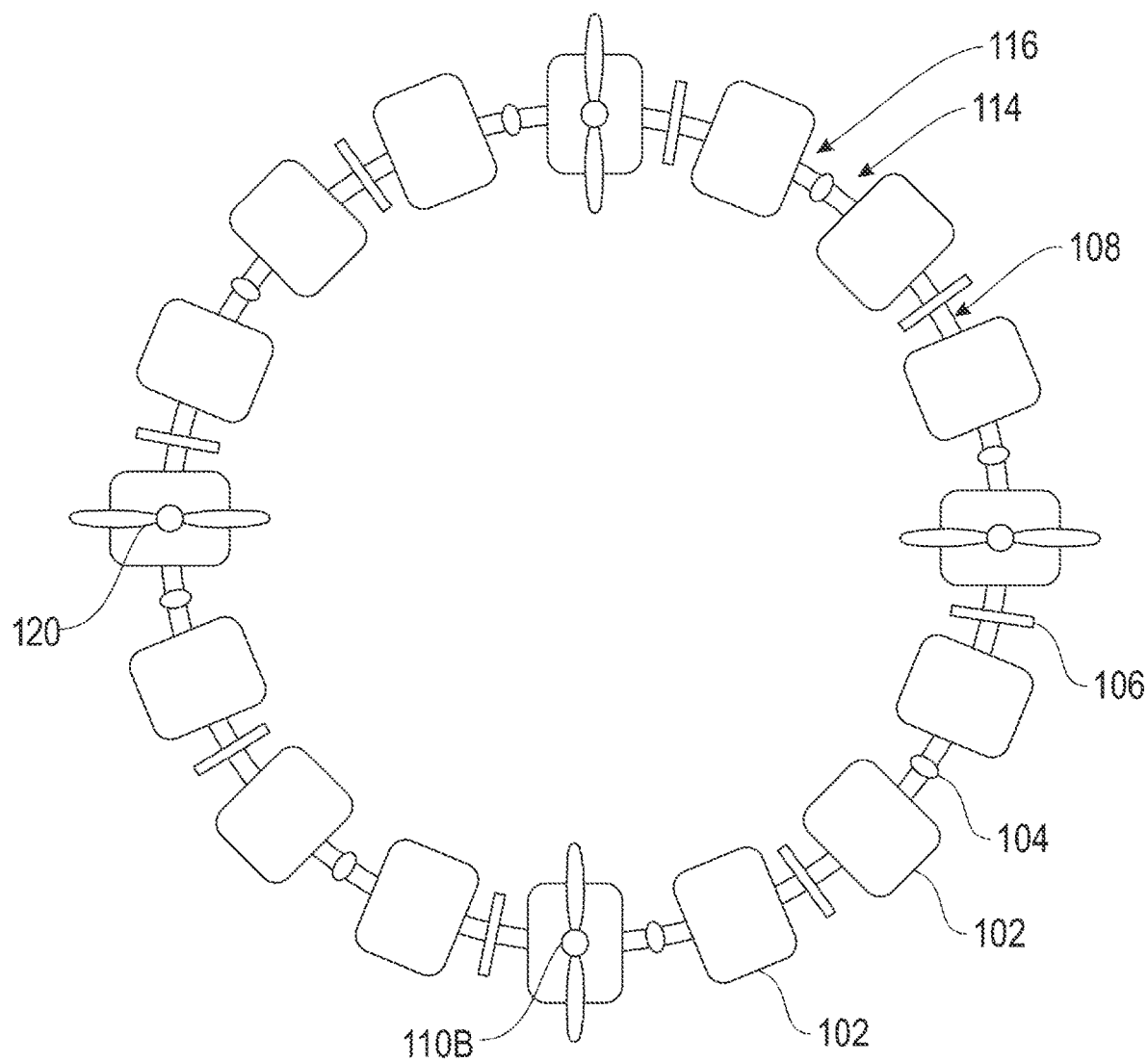
FIG. 2 is a schematic, top-view illustration of the robot of FIG. 1 in a drone configuration, in accordance with embodiments of the present disclosure.

FIG. 2 shows a schematic, top-view illustration of the robot 100 in a drone configuration, consistent with some embodiments. The robot 100 can be converted to a round or circular shape, as shown, by connecting, joining or coupling a first end 114 and a second end 116 of the robot 100 while in the snake-arm configuration (as shown FIG. 1). Any suitable mechanism for coupling two ends, such as the first and second ends 114, 116, of the robot 100 are contemplated by the disclosure. Any module 102 can reversibly couple to another module 102. For example, the coupling mechanism can be mechanical in nature or magnetic in nature. The coupling mechanism can be capable of reversibly, i.e., coupling and un-coupling, and repeatedly coupling the first end 114 to the second end 116. The coupling mechanism shown in FIGS. 1-2 includes a pair of magnetic couplers that can reversibly attach the first end 114 to the second end 116 of the robot 100. When the robot 100 is in the drone configuration, the flexible joints 104, for example, can then become rigid in order to make the robot 100 remain rigid once in the drone configuration. The joints 104, therefore, also can include a locking mechanism for converting the joints from rigid to flexible and vice versa. Additionally, other suitable methods of making the robot rigid in structure in the drone configuration are also contemplated.

While in the drone configuration, four (4) rotors 120 are shown in an expanded position 110B enabling the robot 100 to fly. Rotation of the rotors 120 in the expanded position 110B can create a lift force sufficient for flying. The number and spacing of the rotors 120 in the expanded position 110B can be increased or decreased for flight of the robot 100, which can be dependent upon weight of the robot 100. The cross-section of the robot 100 is larger in the drone configuration (FIG. 2) than in the snake-arm configuration (FIG. 1). When the robot 100 is converted to the drone configuration, the robot 100 can access aerial surroundings using the expanded rotors 120 (in expanded position 110B) that allow for flight.

Figure 3:
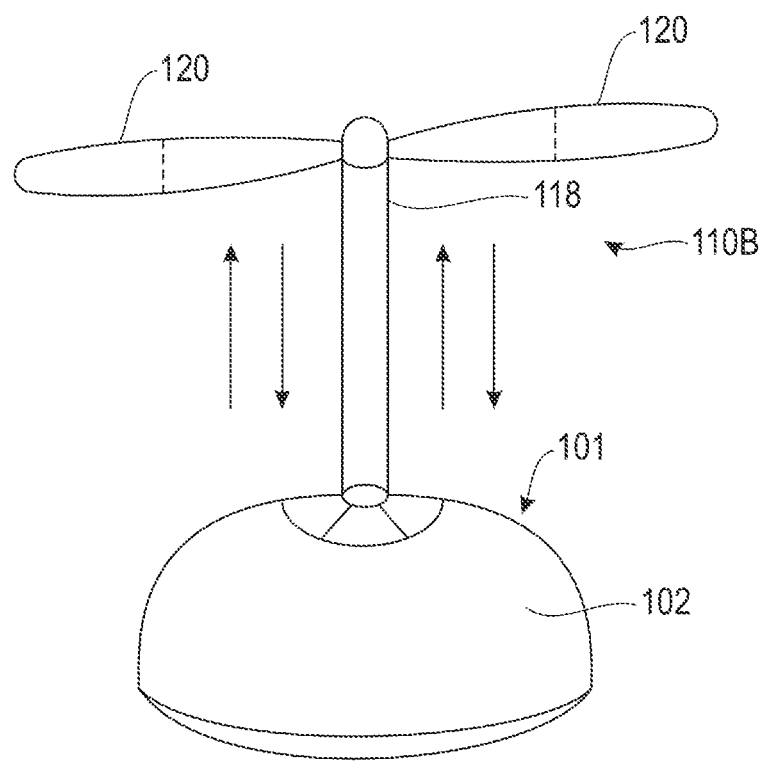
FIG. 3 is a schematic, side-view illustration of a module of the robot of FIG. 2 in the drone configuration, in accordance with embodiments of the present disclosure.

FIG. 3 illustrates a schematic, side-view of one module 102 including one expanded rotor 110B extending from an upper surface 101 of the module 102, consistent with some embodiments. The expanded rotor 110B shown includes a stem portion 118 with two (2) blades 120 extending therefrom. Arrows and dashed lines indicate how the expanded rotor 110B can be contracted to fit into the module 102, although other methods of contraction are also contemplated by the disclosure. A stem 118 and a plurality of blades 120 can be collapsible/retractable completely or partially into the module 102. A rotational speed and/or angle of attack of the rotors 110, in both the collapsed position 110A (see FIG. 1) and the expanded position 110B, can be autonomously and/or remotely, computer-controlled. A different number of blades 120 are also contemplated by the disclosure, and not limited to those shown.

Figure 4:
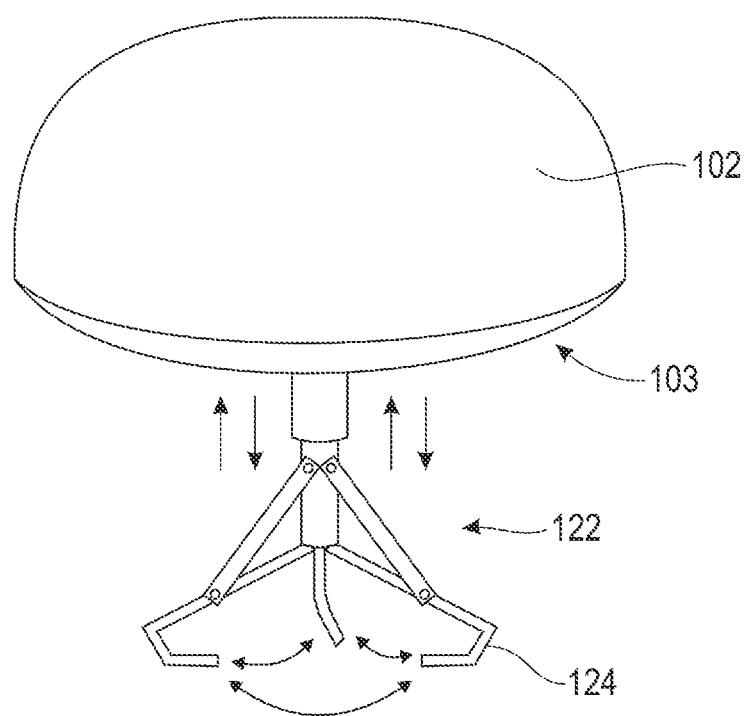
FIG. 4 is a schematic, side-view illustration of a module of the robot of FIG. 2 in the drone configuration, in accordance with embodiments of the present disclosure.

FIG. 4 shows a side-view of one module 102 including a gripping mechanism 122 extending from a lower surface 103 of the module 102, consistent with some embodiments. The gripping mechanism 122, as shown includes three (3) grippers 124, but other suitable numbers of the grippers 124 are contemplated. The gripping mechanism 122 can perform tasks by gripping and/or releasing an object. One or more gripping mechanisms 122 can be included in the robot 100. The gripping mechanism 122 can be retractable such that, in the snake-arm configuration, the gripping mechanism 122 does not extend from the robot 100 and interfere with movement of the robot 100. Other suitable gripping mechanisms 122 are contemplated by the disclosure.

It is contemplated that the robot 100, when in the snake-arm configuration (FIG. 1), can evaluate the dimensions of an object or objects to be carried out, for example. For example, a controller and cameras can be used to measure the size of an object. Another example, without limitation, of evaluating an object can be using a means for measuring weight of the object, such as by an accelerometer. Based on the dimensions, and available flying space in the surroundings, the robot 100 can identify what dimensions the robot 100 should have in the drone configuration. For example, if all of the modules 102 included in the robot 100 in the snake-arm configuration are not needed for the drone configuration, then those modules 102 can be detached and left out of the robot 100 before converting to its drone configuration to enable greater load-carrying capacity. In addition, the robot 100 in the snake-arm configuration can identify how many rounds or trips of carrying objects that may be required to be undertaken to complete the assigned task. In addition, the robot 100 can be converted, as necessary, to the smaller drone configurations with dimensions to fly and/or maneuver within the surroundings.

Although not shown, the robot 100 can include various cameras, sensors, computing modules, batteries, a global position system (GPS), etc. The gripping mechanism 122 can, for example be combined with a camera, for example, to allow for remote viewing of an object as well as more accurate gripper 124 placement.

Based on a particular operational need for performing a particular activity, such as a need for moving a large object, a plurality of robots 100 can be coupled with each other to create a longer running length of the robot 100 in the snake-arm configuration. Joining multiple robots 100 in the snake-arm configuration together can result in a larger drone after converting the joined robots 100 to the drone configuration. Any suitable methods of joining the multiple robots 100 are contemplated, such as the mechanical coupling or magnetic coupling described above, for example.

A desired shape and size of the robot 100 in the drone configuration can also be determined based on a size and shape of a parking spot or temporary observation location, for example. This spot or location is not the home base for the robot 100. A parking spot size and shape can be determined using cameras, for example, and the size and shape of the robot 100 can then be optimized based on the desired parking spot size.

When the robot 100 is converted from the drone configuration back to the snake-arm configuration, the circular shape of the robot 100 can split to form first and second ends at any positions (or joints) in the robot 100, i.e., not only where it was split previously. In some embodiments, any of the modules 102 surrounding flexible joints 104 can become first and second ends 114, 116 of the robot 100 in the snake-arm configuration.

FIG. 5 illustrates an embodiment of a system 500 in accordance with the disclosure. System 500 depicts an overall architecture, and not all components are required for all embodiments. For example, in some embodiments of the system 500, the robot 100 in the drone configuration (however, the snake configuration can also be used) can be completely autonomous and may not require a command center (e.g., a computer) 504, and can be capable of carrying out the entire search and rescue mission. The robot 100 can communicate wirelessly with a base station 502, which in turn can connect with the internet 508. The command center 504 and a mobile device 506 can be connected to the internet and can communicate with each other and with the robot 100.

The system 500 allows for analyzing available passages, and how to perform activity in the surroundings, etc. The system 500 can identify how the robot 100 can perform tasks and be mobile in the surroundings. Based on the identified mobility possibility in the surroundings, the system 500 can identify if the snake-arm configuration or the drone configuration of the robot 100 will be taken. If the proposed system 500 identifies that mobility by air is preferred, then the robot 100 may change from the snake-arm configuration to the drone configuration. Based on current operational needs, the robot 100 can be converted between the snake-arm configuration and the drone configuration and vice versa. A plurality of robots 100 can be joined if needed in order to increase the length of the robot 100 or the diameter of the robot 100 in the drone configuration. Also, the robot 100 can be split at different joints 104 in order to form robots 100 having a reduced length or a reduced diameter in the drone configuration.

FIG. 6 is a flow diagram of a process 600 for delivering a convertible robot to a rescue site, in accordance with embodiments of the disclosure. An operation (610 in FIG. 6) of the process 600 can be providing a convertible robot 100 including a convertible robot 100 (in FIG. 1) comprising a plurality of modules 102 connected to each other with a plurality of joints (e.g., 104 in FIG. 1), and a coupling (e.g., one joint 104 formed by joining or coupling first and second ends 114, 116 in FIG. 1) that is adapted to allow for conversion between a snake-arm configuration and a drone configuration. Additionally, the process 600 can include an operation (620 in FIG. 6) of converting the convertible robot 100 (in FIG. 1) from one configuration to the other.

The process can also include connecting the first and second ends 114, 116 of the convertible robot 100. A plurality of flight rotary assemblies 120 with each of the plurality of flight rotary assemblies 120 being secured to one of the plurality of modules 102. The process can further include expanding the plurality of flight rotary assemblies 120. Another operation can include disconnecting the first and second ends 114, 116 of the convertible robot 100 in the drone configuration, and can include an operation of collapsing the flight rotary assemblies 120. The process can also include extending the at least one gripping and releasing assembly 122. The at least one gripping and releasing assembly 122 can be located on a bottom portion 103 of at least one of the plurality of modules 102. The at least one gripping and releasing assembly 122 can be in a retracted position when the convertible robot 100 is in the snake-arm configuration and is in an extended position adapted to allow for gripping or releasing an object when the convertible robot 100 is in the drone configuration. The process can also include an operation of remotely controlling the convertible robot 100 to convert the convertible robot 100 from one of the configurations to the other.

For purposes of description herein, the terms "upper," "lower," "top," "bottom," "left," "right," "rear," "front," "vertical," "horizontal," and derivatives thereof shall relate to the devices as oriented in the figures. However, it is to be understood that the devices can assume various alternative orientations and step sequences, except where expressly specified to the contrary. It is also to be understood that the specific devices and processes illustrated in the attached drawings, and described in the following disclosure, are simply exemplary embodiments of the inventive concepts defined in the appended claims. Hence, other physical characteristics relating to the embodiments disclosed herein are not to be considered as limiting, unless the claims expressly state otherwise.

For purposes of this description, certain aspects, advantages, and novel features of the embodiments of this disclosure are described herein. The disclosed processes, and systems should not be construed as being limiting in any way. Instead, the present disclosure is directed toward all novel and nonobvious features and aspects of the various disclosed embodiments, alone and in various combinations and sub-combinations with one another. The processes, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed processes can be used in conjunction with other processes. Additionally, the description sometimes uses terms like "provide" or "achieve" to describe the disclosed processes. These terms are high-level abstractions of the actual operations that are performed. The actual operations that correspond to these terms can vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A convertible robot comprising:
    a plurality of modules connected one to another by one of a plurality of joints, wherein the plurality of modules has a first end and a second end that is adapted to allow for removable attachment to the first end; and
    a coupling reversibly converts the plurality of modules at least between two configurations:
        a snake-arm configuration in which the plurality of modules are in an elongated arrangement, wherein the snake-arm configuration is configured to allow for movement along terrain and through passages; and
        a drone configuration in which the first end and the second end of the plurality of modules are attached and in a loop-shaped arrangement, wherein the drone configuration is configured for flight.

2. The convertible robot of claim 1, further comprising:
    a movement control assembly for controlling movement of the convertible robot.

3. The convertible robot of claim 1, wherein the plurality of joints that connect the plurality of modules are flexible when the convertible robot is in the snake-arm configuration and are rigid when the convertible robot is in the drone configuration.

4. The convertible robot of claim 1, further comprising:
    at least one camera adapted to allow for capturing of images.

5. The convertible robot of claim 1, wherein the plurality of joints are adapted to allow the plurality of modules to be split at the plurality of joints and the plurality of joints are adapted to allow for re-attachment.

6. The convertible robot of claim 1, further comprising:
    a plurality of flight rotary assemblies configured to be secured to the plurality of modules.

7. The convertible robot of claim 6, wherein the plurality of flight rotary assemblies are in a collapsed position when the convertible robot is in the snake-arm configuration and are in an expanded position adapted to allow for flight when the convertible robot is in the drone configuration.

8. The convertible robot of claim 1, further comprising:
    at least one gripping and releasing assembly located on a bottom portion of at least one of the plurality of modules.

9. The convertible robot of claim 8, wherein the at least one gripping and releasing assembly is in a retracted position when the convertible robot is in the snake-arm configuration and is in an extended position adapted to allow for gripping or releasing an object when the convertible robot is in the drone configuration.

10. A system comprising:
a plurality of convertible robots comprising:
- a plurality of modules connected one to another by one of a plurality of joints, wherein the plurality of modules has a first end and a second end that is adapted to allow for removable attachment to the first end; and
- a coupling that reversibly converts the plurality of modules at least between two configurations:
  - a snake-arm configuration in which the plurality of modules are in an elongated arrangement, wherein the snake-arm configuration is configured to allow for movement along terrain and through passages; and
  - a drone configuration in which the first end and the second end of the plurality of modules are attached and in a loop-shaped arrangement, wherein the drone configuration is configured for flight,
wherein the plurality of convertible robots are adapted to allow for attachment to each other while in the snake-arm configuration and adapted to allow for remaining attached to each other in the drone configuration.

11. The system of claim 10, wherein the plurality of convertible robots are configured to be attached by joining the first end of one of the plurality of convertible robots to the first end or the second end of another of the plurality of convertible robots.

12. The system of claim 10, wherein the plurality of joints that connect the plurality of modules in the plurality of convertible robots are flexible when the plurality of convertible robots are in the snake-arm configuration and are rigid when the plurality of convertible robots are in the drone configuration.

13. The system of claim 10, wherein the plurality of convertible robots further comprise:
a plurality of flight rotary assemblies configured to be secured to the plurality of modules.

14. A method of delivering a convertible robot to a rescue site, the method comprising:
providing the convertible robot comprising:
- a plurality of modules connected one to another by one of a plurality of joints, wherein the plurality of modules has a first end and a second end that is adapted to allow for removable attachment to the first end; and
- a coupling that reversibly converts the plurality of modules at least between two configurations:
  - a snake-arm configuration in which the plurality of modules are in an elongated arrangement, wherein the snake-arm configuration is configured to allow for movement along terrain and through passages; and
  - a drone configuration in which the first end and the second end of the plurality of modules are attached and in a loop-shaped arrangement, wherein the drone configuration is configured for flight; and
converting the convertible robot from one of the two configurations to another of the two configurations.

15. The method of claim 14, further comprising:
remotely controlling the convertible robot to convert the convertible robot from the one of the two configurations to the other of the two configurations.

16. The method of claim 14, wherein the convertible robot further comprises:
at least one gripping and releasing assembly located on a bottom portion of at least one of the plurality of modules.

17. The method of claim 16, wherein the at least one gripping and releasing assembly is in a retracted position when the convertible robot is in the snake-arm configuration and is in an extended position adapted to allow for gripping or releasing an object when the convertible robot is in the drone configuration, the method further comprising:
extending the at least one gripping and releasing assembly.

18. The method of claim 14, wherein the convertible robot further comprises:
a plurality of flight rotary assemblies configured to be secured to the plurality of modules.

19. The method of claim 18, wherein the converting the convertible robot is from the snake-arm configuration to the drone configuration, and the method further comprises:
connecting the first and second ends; and
expanding the plurality of flight rotary assemblies.

20. The method of claim 18, wherein the converting the convertible robot is from the drone configuration to the snake-arm configuration, and the plurality of flight rotary assemblies are in a collapsed position when the convertible robot is in the snake-arm configuration and are in an expanded position adapted to allow for flight when the convertible robot is in the drone configuration, and the method further comprises:
disconnecting the first end and the second end; and
collapsing the plurality of flight rotary assemblies.

* * * * *